US006945552B2

(12) United States Patent
Stone

(10) Patent No.: US 6,945,552 B2
(45) Date of Patent: Sep. 20, 2005

(54) TRAILER HITCH SECURITY DEVICE

(76) Inventor: Clyde M. Stone, 9 Century Ct., Trophy Club, TX (US) 76262

( * ) Notice: Subject to any disclaimer, the term of this patent is extended or adjusted under 35 U.S.C. 154(b) by 0 days.

(21) Appl. No.: 10/775,052

(22) Filed: Feb. 7, 2004

(65) Prior Publication Data

US 2004/0232654 A1 Nov. 25, 2004

Related U.S. Application Data

(60) Provisional application No. 60/445,412, filed on Feb. 7, 2003.

(51) Int. Cl.[7] ........ E05B 73/00

(52) U.S. Cl. ........ 280/507; 280/511; 70/14

(58) Field of Search ........ 280/400, 423.1, 280/432, 504, 507, 511; 70/2, 6, 7, 13, 14, 18, 19, 158–169

(56) References Cited

U.S. PATENT DOCUMENTS

| | | | | | |
|---|---|---|---|---|---|
| 3,139,291 | A | * | 6/1964 | Geresy | 280/507 |
| 3,237,969 | A | * | 3/1966 | Geresy | 280/507 |
| 4,861,062 | A | * | 8/1989 | Stidsen | 280/507 |
| 5,743,548 | A | * | 4/1998 | Gaspard | 280/507 |
| 6,203,050 | B1 | * | 3/2001 | Stech | 280/507 |
| 6,270,107 | B1 | * | 8/2001 | Stoughton | 280/507 |
| 6,722,686 | B2 | * | 4/2004 | Koy | 280/507 |

* cited by examiner

*Primary Examiner*—Matthew Luby

(57) ABSTRACT

A device for securing the locking nut on trailer hitches. An exemplary embodiment comprises: (1) a protective cup that attaches to a (2) top member, by (3) an internal hinge, so that when the cup and the top member are closed, and locked by (4) a lock, the device encloses the locking nut of the trailer hitch so that the locking nut cannot be loosened or removed.

1 Claim, 5 Drawing Sheets

TRAILER HITCH SECURITY DEVICE

RELATED APPLICATIONS

This application is related to and derives priority from U.S. Provisional application 60/445,412, filed Feb. 7, 2003, and which is incorporated herein by reference.

FIELD OF THE INVENTION

The present invention relates to add-on equipment for motor vehicles; more particularly, a security device or lock for trailer hitches is disclosed.

BACKGROUND

It is estimated that over ten million vehicles in the United States are equipped with trailer hitches—almost all trucks, recreational vehicles and pickups are so equipped. Also many cars are furnished with trailer hitches to pull travel trailers and small utility trailers. When considering the world, an estimate of over fifty million vehicles having trailer hitches would seem reasonable.

Trailer hitches have been designed to permit trailers to be quickly and conveniently attached and detached. But by designing trailer hitches to be easily used, trailers and attached wheeled carriers can be easily detached and stolen easily by removing the ball and locking nut of the hitch.

Therefore, it is clear that a simple, yet effective means for securing trailers to trailer hitches is of significant utility and value to owners of trailers and hitches.

SUMMARY

In response to the value and utility of a means for securing trailer hitches, herein is disclosed a device for securely enclosing and protecting a trailer hitch.

The device is disclosed in an exemplary embodiment comprising: (1) a protective cup that attaches to, is held by, and encloses the locking nut of the trailer hitch, the cup attached by (2) a hinge to (3) a top member, the top member held by the hitch ball, bolt and locking nut, the hinge enclosed by the cup and top member, and; (4) a locking means for securing the cup so that the locking nut cannot be loosened or removed.

The device illustrated by the exemplary embodiment will be seen to have a number of advantages and benefits.

A first objective and benefit is that the device does not require modifications to the trailer hitch for installation.

A second advantage and benefit is the device is simple to manufacture, and therefore, can be sold at a relatively low cost.

And another advantage is, by its simplicity, the device can be made to be extremely resilient and resistant to tampering and attack.

And yet another advantage and benefit is the device is simple to use.

These benefits and advantages, plus others, will be apparent from the drawings and descriptions that follow.

DETAILED DESCRIPTION

An Exemplary Embodiment

Figure 1:
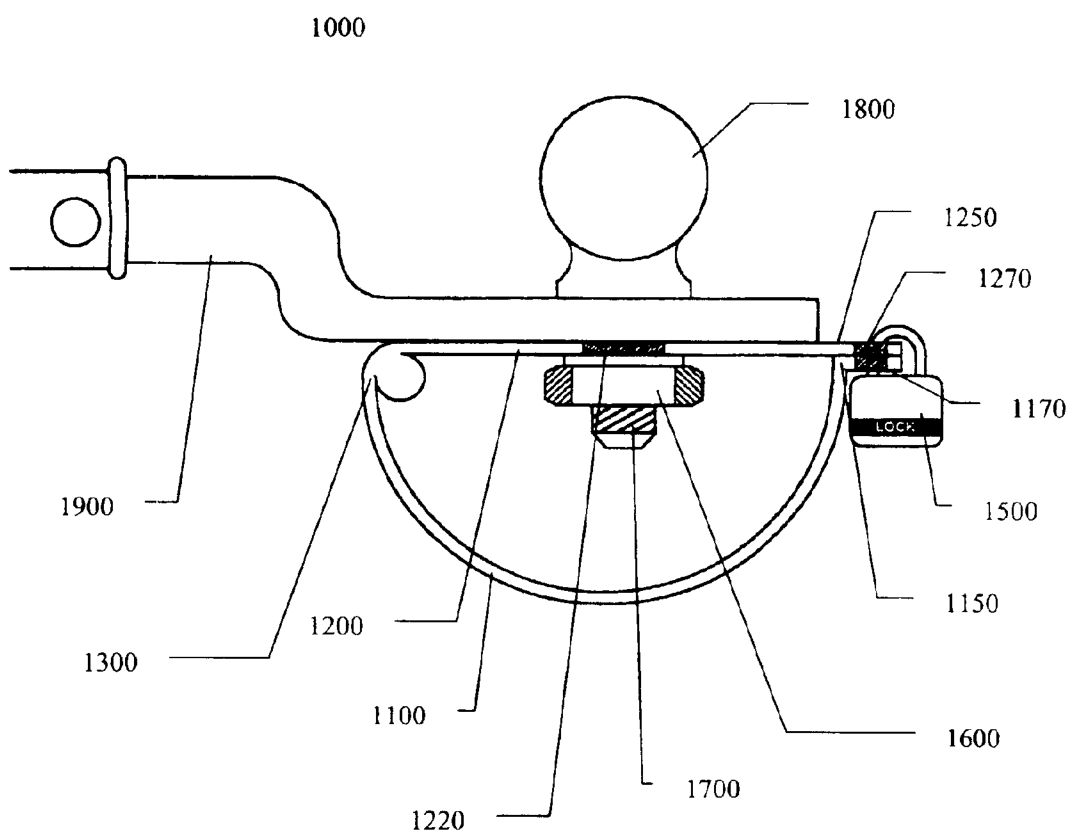
FIG. 1 shows a cross section of the device locked in place securing the locking nut of a trailer hitch, thereby preventing access to the locking nut to prevent unwanted removal thereof.

The invention comprises the hitch device as shown in FIG. 1, wherein FIG. 1 illustrates the hitch device 1000 used with a standard trailer hitch 1900 having a hitch ball 1800, with hitch bolt 1700, which is held to the trailer hitch 1900 by a locking nut 1600. The invention comprising the hitch device 1000 has: (1) a lower cup or cap 1100; (2) a top member 1200, which is attached to the cup by an internal hinge 1300, the top member having a hole 1220, through which the hitch bolt is received, the top member 1200 held to the trailer hitch 1900 by the hitch bolt 1700 and hitch nut 1600. The cup 1100 is furnished with a protruding lip 1150, the lip 1150 having a hole 1170. The top member 1200 also has a lip 1250, which has a hole 1270 in alignment with the hole 1150, when the cup 1100 is closed against the top member 1200. When so closed, a lock 1500 may be passed through the holes 1170 and 1270 whereby the cup and the top member are secured together. It will be appreciated that the hitch bolt 1700 and the hitch nut 1600 are completely enclosed by the hitch device 1000.

The hitch device 1000 is made from heavy metal, such as steel, which makes it very difficult to cut or saw. When the hitch device 1000 is locked in place, it will be seen that it will be extremely difficult, if not impossible to remove the hitch ball, therefore a trailer that is held by the hitch ball cannot be easily removed or stolen by removing the hitch ball.

Figure 2:
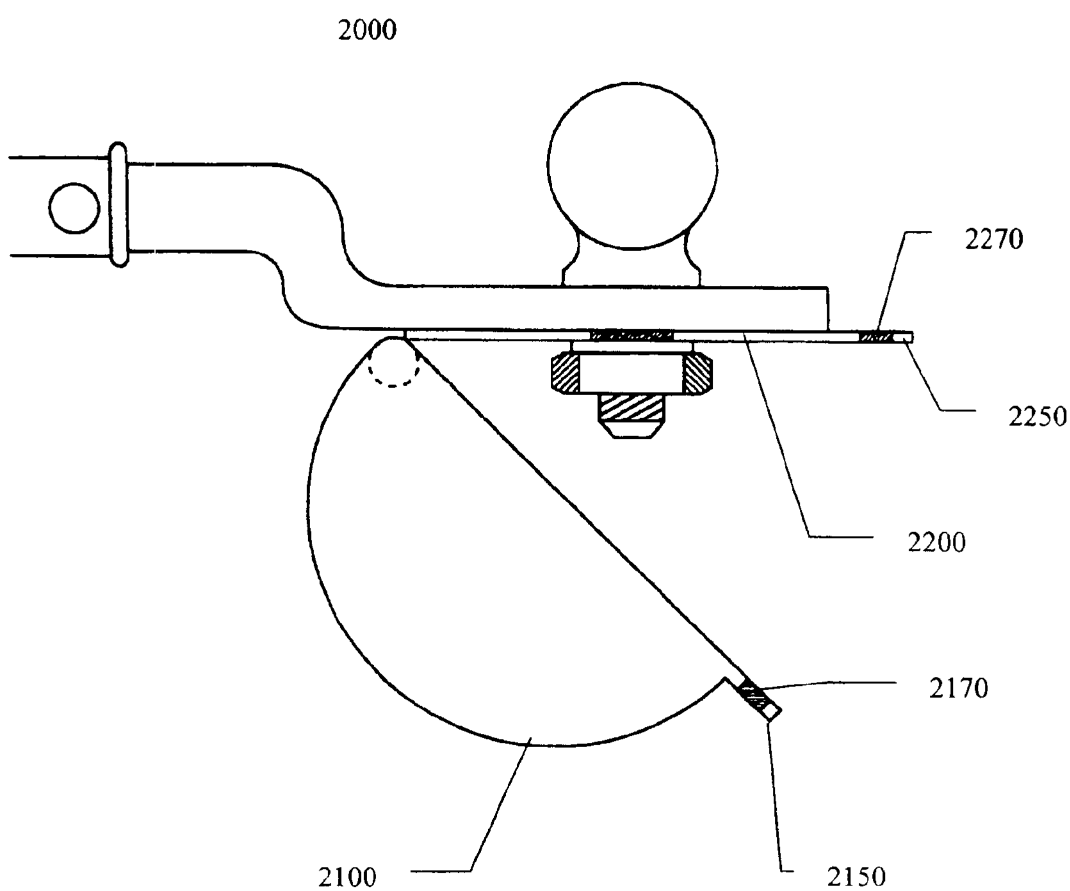
FIG. 2 is a cross section of the device, the device unlocked to permit access to the locking nut of a trailer hitch ball.

With reference to FIG. 2, the hitch device 2000 is shown in the open or unsecured state, wherein the cup 2100 is open. Each of the holes 2270 2170, made to receive a lock are shown.

Figure 3:
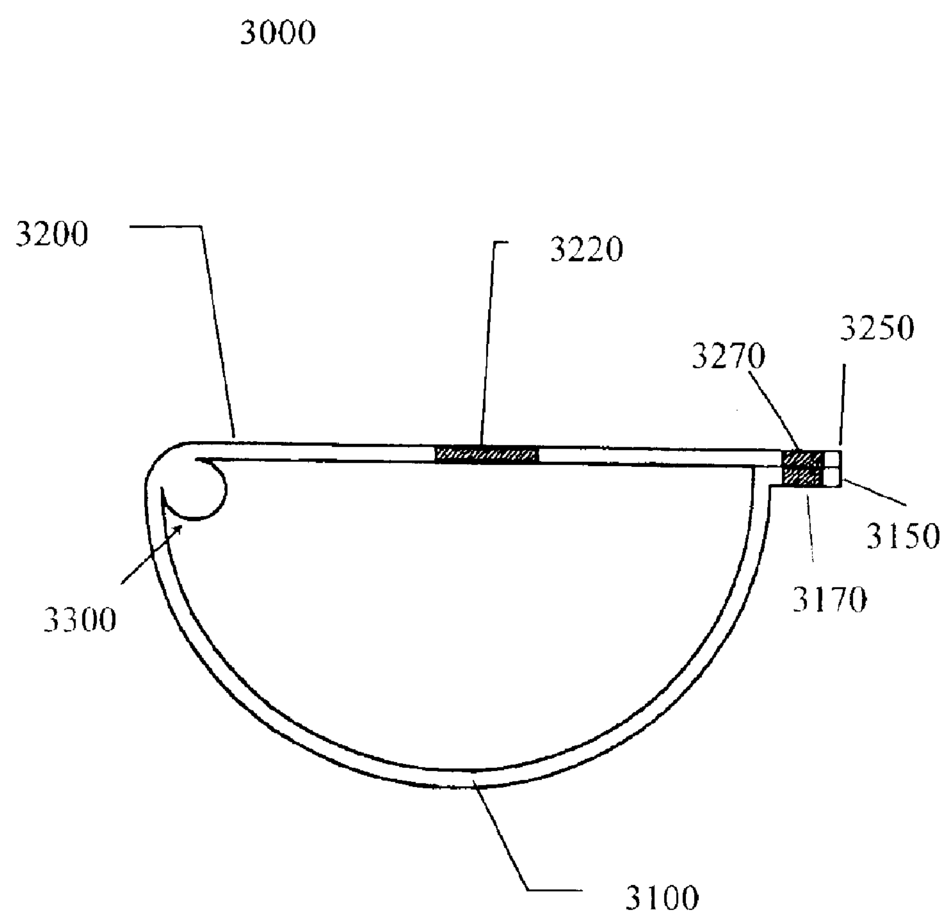
FIG. 3 is a cross section of the device showing the means by which the device is attached to a trailer hitch ball, and the means by which the device is locked and secured.

With reference to FIG. 3, the hitch device 3000 is shown in cross section with internal hinge 3300 constraining the bottom member 3100, having the form of a cup to enclose a trailer hitch locking nut, the bottom member 3100 rotating open and shut with respect to the top member 3200. The hole 3220 in the top member 3200 is shown, the hole 3220 accepting a trailer hitch bolt, which in turn holds the hitch device immovably in place with respect to the trailer hitch. When the top member 3200 and the bottom member 3100 are closed together, the hole 3270 in the lip 3250 of the top member 3200 and the hole 3170 in the lip 3150 of the bottom member 3100 are in alignment to accept a lock to hold the top member 3200 and the bottom member 3100 together.

Figure 4:
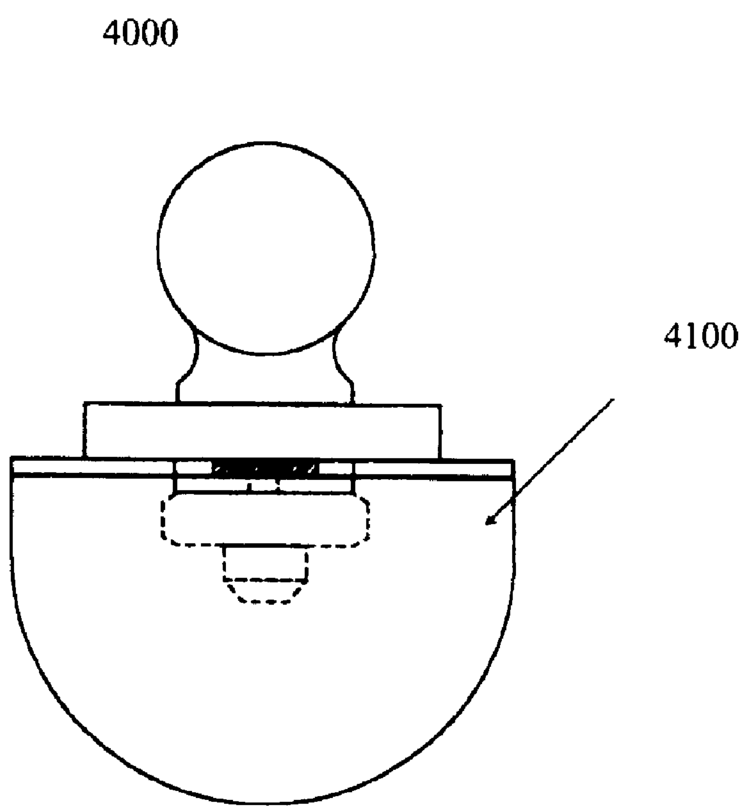
FIG. 4 is a front view showing the device in locked position, whereby the locking nut of the hitch is enclosed and secured.

Referring to FIG. 4, the device 4000 completely encloses the hitch bolt and nut, when the bottom member 4100 in the form of a cup is closed and locked.

Figure 5:
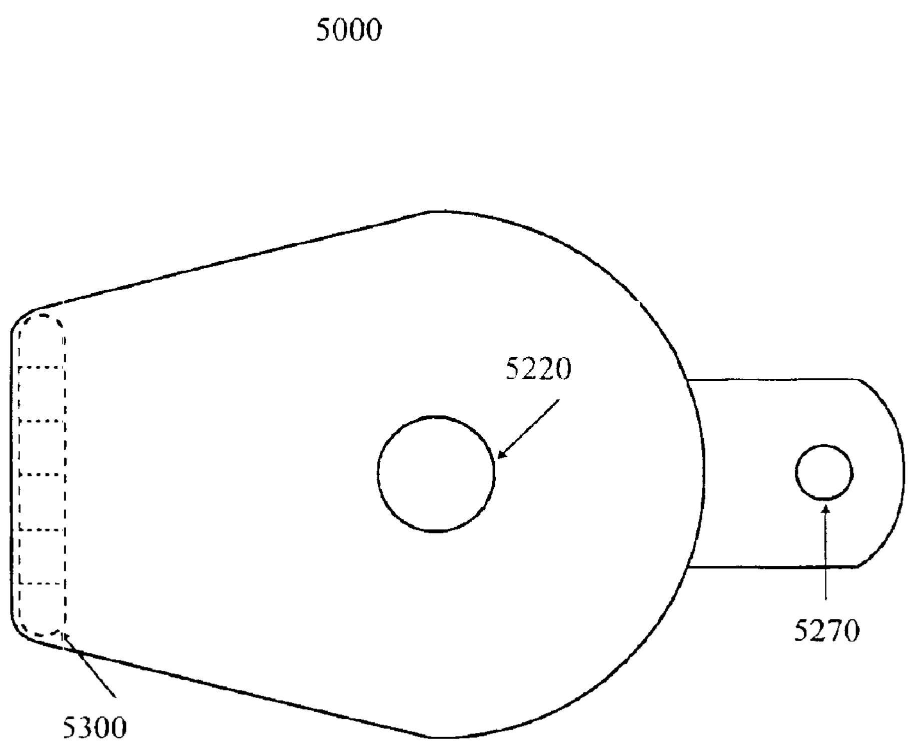
FIG. 5 shows a possible configuration of the device when viewed from the top.

With reference to FIG. 5, the device 5000 is shown with one possible form factor, wherein a top view shows the internal hinge 5300 holding the top member and the cup. The hole in the top member 5220 is shown, whereby the hole 5220 receives the hitch bolt and is held by the hitch nut. Further the top member lip is shown and the hole therein 5270, whereby the hole 5270 receives the bolt of a lock.

DISCLOSURE SUMMARY

While only one embodiment of the present invention has been shown and described, it will be understood that various modifications and changes could be made without departing from the spirit and scope of the invention. For example, different shapes and form factors are possible, or different means can be conceived for locking the top member and the cup together. Therefore, the true scope of the invention will be described by the claims that follow.

What is claimed is:

1. A device for enclosing a trailer hitch, the device preventing the removal of the trailer hitch bolt by enclosing the trailer hitch bolt, the device comprising:

a top member, the top member having a first hole, the first hole receiving the trailer hitch bolt to immovably hold the device against the bottom of the trailer hitch, the top member having a lip, the lip having a second hole for receiving the bolt of a lock;

a bottom member, in the form of a cup, the bottom member having a lip, the lip having a third hole, the bottom member attached to the top member by a hinge, whereby the bottom member opens and closes against the top member, rotating about the hinge, whereby when the bottom member is closed against the top member, the top member and the bottom member completely enclose the trailer hitch bolt;

the hinge is completely enclosed by the top member and the bottom member; and the second hole in the top member is in alignment with the hole in the bottom member;

whereby the second hole in the top member and the third hole in the bottom member receive a lock, the lock holding the top member against the bottom member to prevent the removal of the trailer hitch bolt.

* * * * *